United States Patent [19]
Chung et al.

[11] Patent Number: 5,155,699
[45] Date of Patent: Oct. 13, 1992

[54] DIVIDER USING NEURAL NETWORK

[75] Inventors: Ho-sun Chung; Sin-jin Kim; Tae-hun Kim, all of Taegu, Rep. of Korea

[73] Assignee: Samsung Electronics Co., Ltd., Suwon, Rep. of Korea

[21] Appl. No.: 550,503

[22] Filed: Jul. 10, 1990

[30] Foreign Application Priority Data

Apr. 3, 1990 [KR] Rep. of Korea .................. 90-4514

[51] Int. Cl.⁵ .............................................. G06F 7/52
[52] U.S. Cl. ................................................ 364/766
[58] Field of Search ............................... 364/766, 767

[56] References Cited

U.S. PATENT DOCUMENTS

| | | | |
|---|---|---|---|
| 3,816,733 | 6/1974 | Sather | 364/766 |
| 4,381,550 | 4/1983 | Baker | 364/766 |
| 4,722,069 | 1/1988 | Ikeda | 364/767 |
| 4,891,780 | 1/1990 | Miyoshi | 364/766 |
| 5,016,211 | 5/1991 | Jeong | 364/786 |

*Primary Examiner*—David H. Malzahn
*Attorney, Agent, or Firm*—Cushman, Darby & Cushman

[57] ABSTRACT

A divider using neural network configurations comprises a subtractor, a selecting means, a first latch means, a second latch means, a shift register and a control means. The subtractor of the divider comprises plural inverters and plural 3-bit full-adders which are composed of four output lines, an input synapse group, a first bias synapse group, a second bias synapse group, a feedback synapse group, a neuron group and an inverter group.

9 Claims, 6 Drawing Sheets

FIG.8 ated borrow value into a quotient of the division result; and a control means for providing the reset signal and the clock pulse.

The subtractor is composed of plural 3-bit adders of which each adder is made of PMOS and NMOS transistors in a neural network configuration.

These features of the present invention will become more readily apparent in the following description of the drawings.

DIVIDER USING NEURAL NETWORK

FIELD OF THE INVENTION

The present invention relates to a divider and, more particularly, to a divider incorporating neural network concepts that provide very high processing speeds and excellent susceptibility to fabrication by integrated circuit techniques.

BACKGROUND OF THE INVENTION

The operation of four fundamental rules is the basis of all arithmetic operations and has been used in many calculation schemes.

Of the four fundamental operation rules, the division operation is the most complicated operation and can be implemented by the software method or by the hardware method which latter method uses a hardware organization composed of a register, a subtractor, and control logic, etc. Of the various hardware methods, the method using combination logic has the highest processing speed because its processing time is limited only by the time necessary for a signal to pass the arrangement of gates.

However, in spite of its high processing speed, the divider by this method has drawbacks requiring substantial chip area.

The method using a register, a subtractor, and control logic is relatively slower in the speed but can reduce the chip area required in comparison with the method using combination logic.

SUMMARY OF THE INVENTION

It is an object of the present invention to provide a divider whose processing speed is very high and which effects a reduction in the required chip area by using the concept of neural networks.

To accomplish this object, in a binary divider which obtains a quotient and a remainder by dividing a dividend by a divisor, a binary divider according to the present invention comprises a subtractor which subtracts the divisor after receiving the dividend 1-bit by 1-bit by inputting it into the least significant bit of a minuend and inputting the value transmitted from a preceding clock into the other bits of the minuend;

a selecting means which selects to transmit the minuend if the subtraction result of the subtractor is negative, and the result value if the subtraction result of the subtractor is positive, respectively;

a first latch means for latching the divisor on the falling edge of a reset signal and supplying it to the subtractor;

a second latch means which is initially cleared according to the reset signal, latches the value transmitted from the selecting means on the rising edge of a clock pulse, supplies the value except the most significant bit of the latched values to the minuend except the least significant bit of the subtractor, and also supplies the latched value to a remainder of the division result;

a shift register which parallel inputs the dividend on the falling edge of the reset signal and serially outputs it one-bit by one-bit from the most significant bit of the dividend inputted on the rising edge of a clock pulse into the least significant bit of the minuend of the subtractor, and, simultaneously, serially inputs a borrow output of the subtractor and parallel outputs the input-

BRIEF DESCRIPTION OF THE DRAWINGS

FIG. 8 is a data state diagram according to a clock of a second latch means and a shift register of FIG. 2.

DESCRIPTION OF THE PREFERRED EMBODIMENT OF THE INVENTION

The fundamental principle of division is that the number of times that a divisor is subtracted as a substrahend from a dividend becomes the quotient and the value of the dividend which is left as a result of subtraction becomes the remainder, when the divisor is so repeatedly subtracted from the dividend that the dividend for the first time becomes less than the divisor or equal to zero irrespective of the concrete representation of the number.

However, the above method is hardly used in practice because the number of subtraction cycles is so large substantial calculation time is required, especially in the case where the dividend is much larger than the divisor.

There are many methods for division, which increase the calculation speed by reducing the number of subtraction cycles.

An algorithm used in the present invention is nearly similar to a reduction to division.

In the case of a reduction to division, when the result of subtraction of the divisor from the dividend is negative the value of the divisor is reduced to the value of the dividend before subtraction by again adding the divisor to the dividend, while the operation of the present invention is performed by taking the value of the dividend before subtraction.

The order of operation is as follows.

Figure 1:
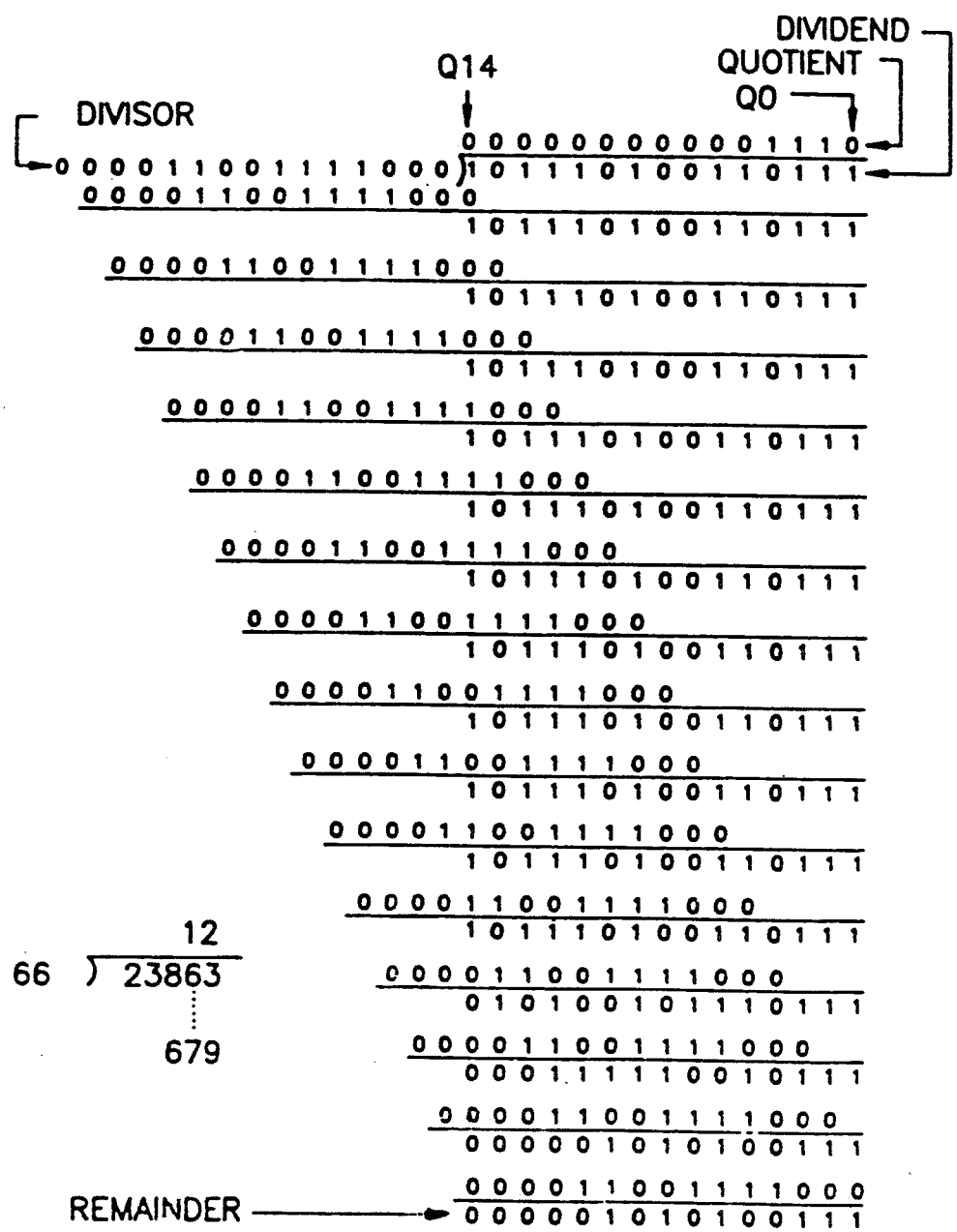
FIG. 1 is a numerical expression diagram for explaining an algorithm of division adopted by the present invention.

As shown in FIG. 1 a subtraction is performed by making the most significant bit of the dividend and the least significant bit of the divisor become the same position.

Fourteen "0"s are regarded as located in the front of the most significant bit of the dividend.

At this time, if the result of the subtraction is negative, that is, the divisor can not be subtracted from the dividend because the dividend is less than the divisor, the value of the most significant bit of the quotient becomes "0" while if the dividend can be subtracted from the divisor, the value of the most significant bit of the quotient becomes "1".

Also, in case where the result is positive, the result value of the subtraction is taken as the minuend, while in the case where the result is negative, the value before subtraction is taken as the minuend of next subtraction.

The subtraction is again performed by taking the value which is shifted by one-bit to the right than the prior stage of operation into the subtrahend.

At this time, Q14 which is the most significant bit of the quotient is obtained from the borrow value.

The next operation is performed by again taking the value of the minuend from the value before subtraction or the result value of subtraction according to the result of the subtraction.

A 15-bit quotient can be obtained by repeating the above process until obtaining Q0, and the value of the dividend after obtaining Q0 becomes a remainder.

A quotient having much more effective bits is obtained by increasing the number of times repeating the above process in order to perform more accurate calculation, that is, obtain the result below the decimal point.

In the present embodiment, a 16-bit divider is implemented by a 15-bit subtractor 1, a selecting means 2, a first latch means 3, a second latch means 4, a shift register 5, and a control means 6, functioning in accordance with the algorithm such as described above.

Here, a 16-bit number includes a sign bit of 1-bit.

Figure 2:
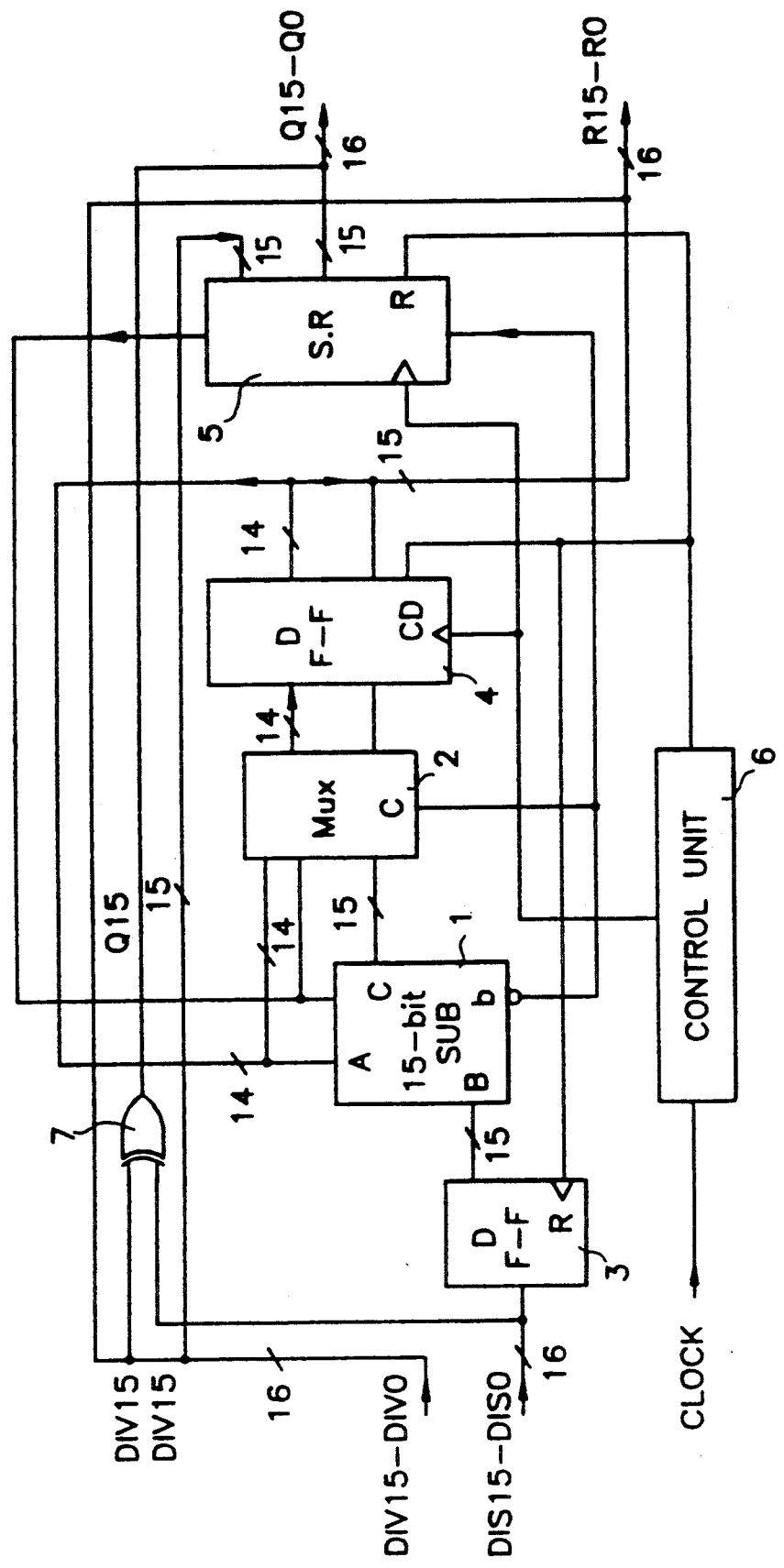
FIG. 2 is a schematic diagram of a 16-bit divider according to the present invention.

As shown in FIG. 2, a 16-bit divider generates a sign bit Q15 of a quotient by combinating each sign bit DIV 15 and DIS 15 among the dividends DIV 15 to DIV0 and the divisors DIS 15 to DIS 0 using an exclusive logic sum gate 7.

A subtractor 1 inputs 1-bit of the dividend into the least significant bit A0 of the minuends A14 to A0 and inputs the value transmitted from a clock (not shown) into the other bits A14 to A1 of the minuends so that it subtracts the divisors from the minuends and outputs the result values C14 to C0.

At this time, if the result value is negative, the borrow output becomes "1", and, if the result value positive, the borrow output "0".

If the borrow output is "1", a selecting means 2 transmits the minuend of the subtractor 1, and, if the borrow output is "0", a selecting means 2 transmits the result value to a second latch means 4.

A first latch means 3 comprises a D-type flip-flop in order to latch the divisor on the falling edge of a reset signal and supply it to the subtractor 1.

A second latch means 4 comprises a D-type flip-flop to which a reset signal is applied to in order to be initially cleared according to the reset signal latch the value transmitted from the selecting means 2 on the rising edge of a clock pulse CP (provided by the control means 6), supply the value except the most significant bit of the latched values into the minuend except the least significant bit, and, also, supply the latched value into a remainder of the division result.

A shift register 5 parallel inputs the dividend on the falling edge of the reset signal and serially outputs one-bit by one-bit from the most significant bit of the dividend inputted on the rising edge of a clock pulse CP into the least significant bit of the minuend of the subtractor 1, and simultaneously, serially inputs a borrow output of the subtractor 1 and parallel outputs the inputted borrow value into a quotient of the division result.

A control means 6 supplies the reset signal and the clock pulse CP by counting the clock CK supplied from the external circuit.

The control means 6 counts one clock for initially resetting the system, the clock numbers corresponding to the bit number of the dividend and one clock for reading out a quotient and a remainder of the division result.

Figure 3:
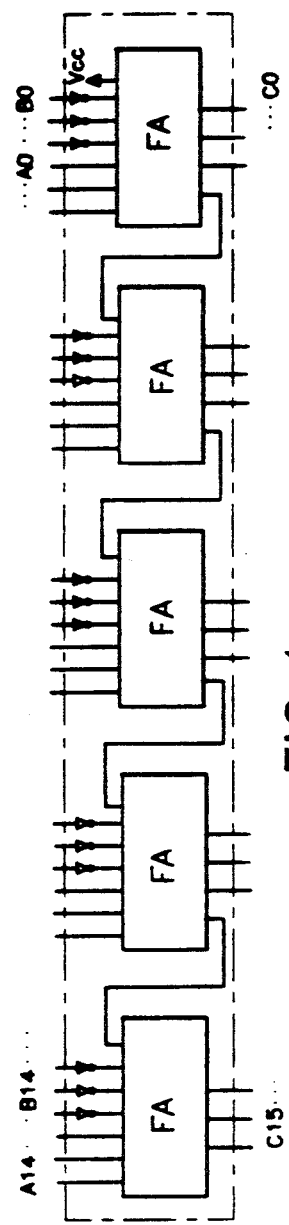
FIG. 3 is a schematic diagram of a 15-bit subtractor of FIG. 2.

As shown in FIG. 3, each 15-bit subtractor such as described above comprises fifteen inverters for inverting the minuend which is inputted and five 3-bit full adders FA.

Five 3-bit full adders FA are connected in cascade so that a carry is transmitted in the upper carry terminal. A first power source voltage Vcc is applied to the full adders FA so that "1" is supplied to the carry inputs of their lowest carry terminals, and the carry outputs of their upper most carry terminals are supplied to the borrow outputs B0 to B14 of the subtractor.

Each 3-bit full-adder inputs 15-bit minuend A14 to A0 and subtrahend B14 to B0 3-bit by 3-bit and outputs the result value C14 to C0 3 bit by 3-bit.

Figure 4:
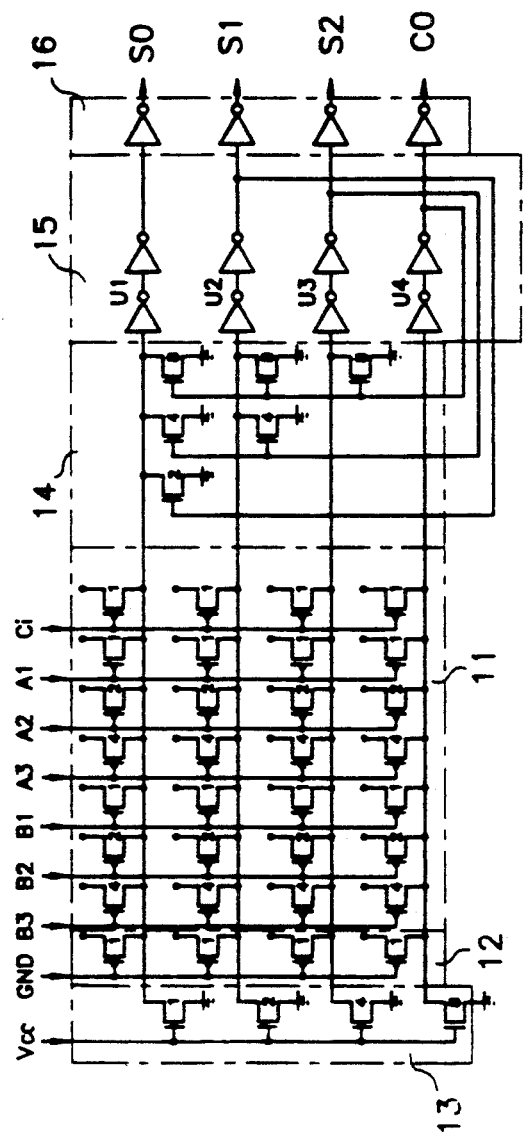
FIG. 4 is a circuit diagram of a 3-bit adder of FIG. 3.

As shown in FIG. 4, each 3-bit full adder FA of the present invention comprises PMOS and NMOS transistors using the neural network concepts.

The 3-bit full adder of FIG. 4 comprises four output lines OL, an input synapse group 11, a first bias synapse group 12, a second bias synapse group 13, a feedback synapse group 14, a neuron group 15 and an inverter group 16.

The input synapse group 11 comprises input synapses for connecting a first power source voltage Vcc to each output line OL as the connecting intensity of the weight of each bit according to the 3-bit augend, the 3-bit addend and the 1-bit carry input transmitted in the lower carry terminal.

The first bias synapse group 12 comprises synapses for supplying a first power source voltage Vcc to each output line as the unit connecting intensity.

The second bias synapse group 13 comprises synapses for biasing each output line with the connecting intensity of the weight of each output bit by a second power source voltage GND.

The feedback synapse group 14 comprises synapses for connecting a second power source voltage GND to the output lines of each lower output bit with the connecting intensity of the weight of the upper output bit according to the value of the upper output bit.

The neuron group 15 comprises CMOS buffers for outputting the excited state if the sum of the connecting intensity of a first power source voltage Vcc is larger than, and the ground state if the sum is smaller than or equal to that of a second power source voltage GND.

The inverter group 16 comprises CMOS inverters for inverting the output bit of each neuron.

The input synapse Group 11 and the first bias synapse Group 12 comprise PMOS transistors and the second bias synapse Group 13 and the feedback synapse Group 14 comprise NMOS transistors.

The connecting intensity of the synapses is established by the geometrical aspect ratio (channel width W/channel length L) of the MOS transistors, and the unit connecting intensity of the synapses establishes the W/L of 5 $\mu$m/2 $\mu$m into 1 for PMOS transistor and the W/L of 2 $\mu$m/2 $\mu$m into 1 for NMOS transistor.

Figure 5:
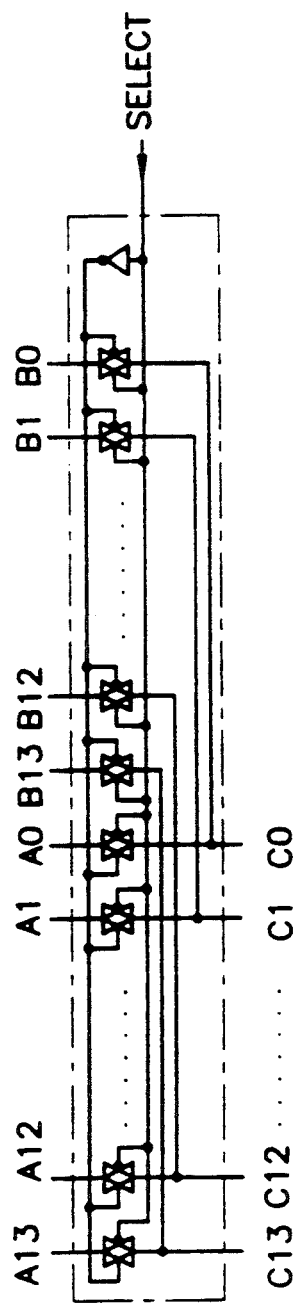
FIG. 5 is a circuit diagram showing one embodiment of a selecting means of FIG. 2.

As shown in FIG. 5, a selecting means of the present invention is a line multiplexer which is composed of CMOS transmission gates and inverters.

The inputted borrow signal is applied to the inversion control terminal of each transmission gate to which the minuend is inputted, and the control terminal of each transmission gate to which the result value of the subtraction is inputted.

The borrow signal inverted through the inverter is applied to the control terminal of each transmission gate to which the minuend is inputted, and the inversion control terminal of each transmission gate to which the result value of subtraction is inputted.

Figure 6:
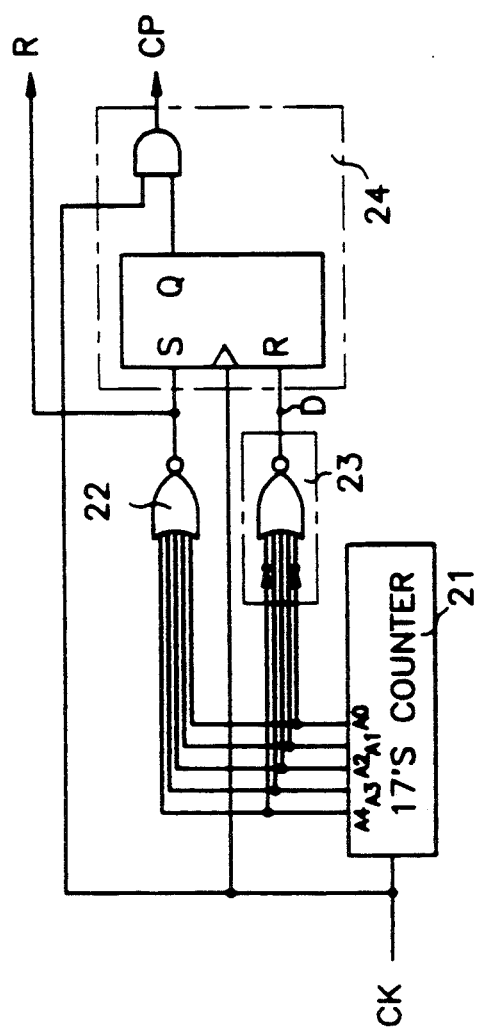
FIG. 6 is a circuit diagram showing one embodiment of a control means of FIG. 2.

As shown in FIG. 6, a control means comprises a 17's counter 21, a resetting means 22, a detecting means 23, and a clock window means 24.

The 17's radix 17 counter 21 is a counter which is automatically reset when the 5-bit output becomes '10001' (decimal 17) by inputting the external clock CK and counting it by seventeen numbers.

The resetting means 22 comprises a 5-input NOR gate for generating the reset signal R from the high signal when the output is '00000' by the combination of the 5-bit output of the counter 21.

The detecting mean 23 comprises two inverters (unnumbered) and a 5-input NOR gate for outputting the high signal into the detecting signal D upon completion of the 17 count when the output is '10001' by the combination of 5-bit output of the counter 21.

The clock window means 24 comprises an SR flip-flop which is set on the falling edge of the reset signal and reset on the falling edge of the detecting signal D, and an AND gate which windows the clock line CK by the output signal Q of the SR flip-flop.

Therefore, the clock pulse CK supplied to the system comprises sixteen clock lines so that they are applied to the clock input terminal of the second latch means 4 and the shift register 5 (FIG. 2).

Thus, a subtraction process is performed fifteen times during the clock pulses fifteen, and the remainders RM14 to RM0 and the quotients Q14 to Q0 which are stored in the second latch means 4 and the shift register 5, are outputted by the sixteenth clock pulse.

Figure 7:
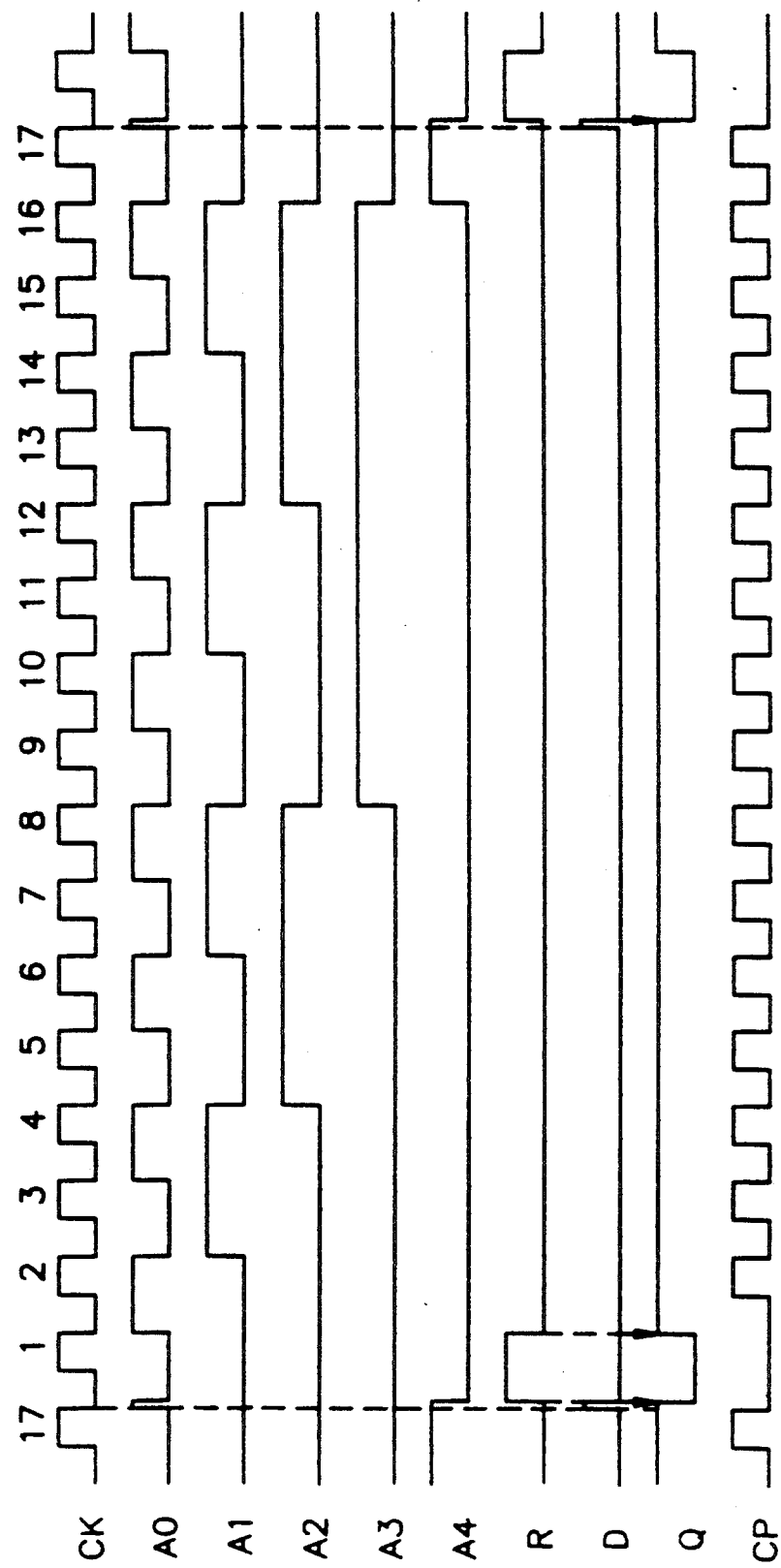
FIG. 7 is a triggering timing diagram of a control means of FIG. 6.

The triggering timing diagram of the control means 6 is shown in FIG. 7.

Figure 8:
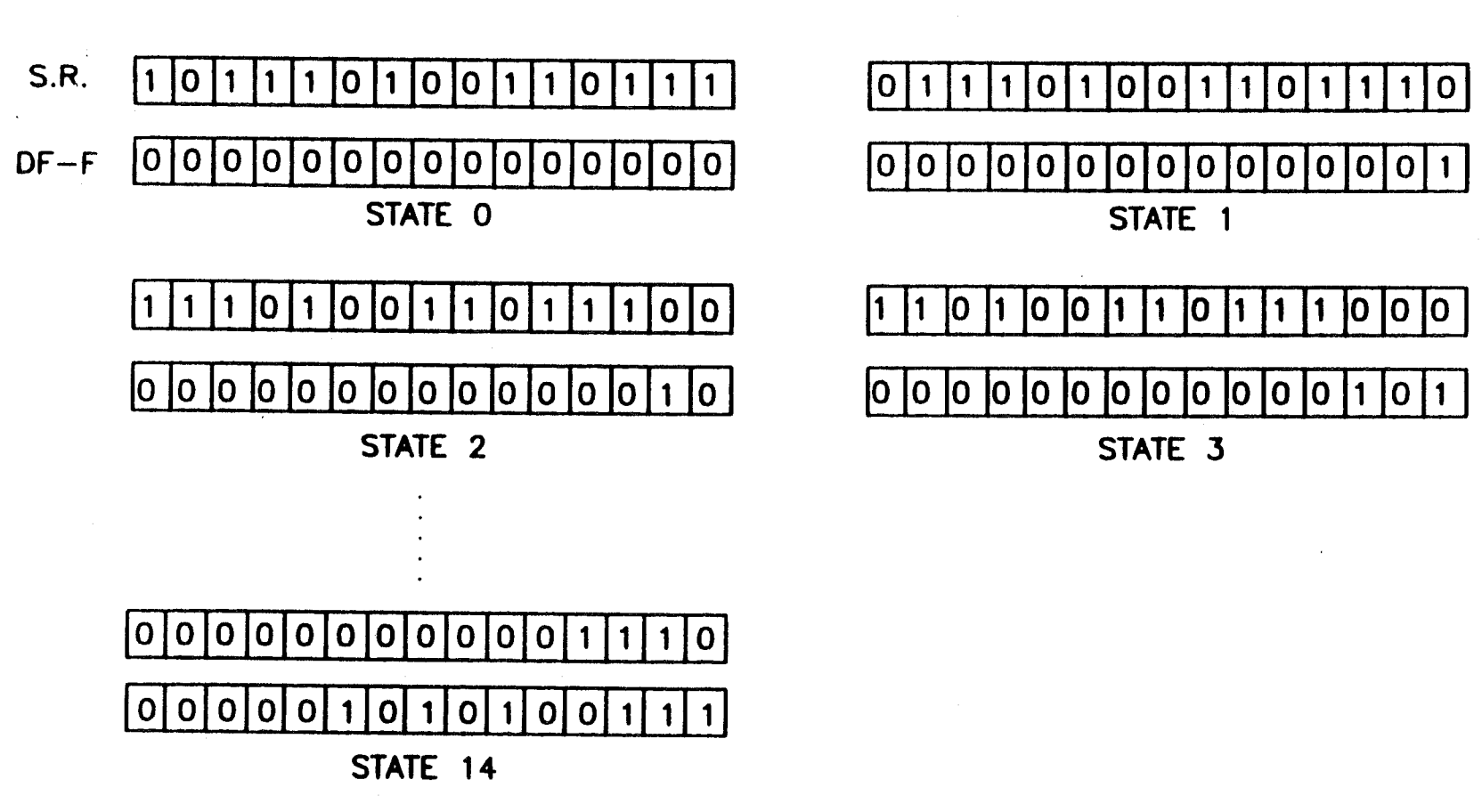

Also, the state diagram of the data memorized in the second latch means 4 and the shift register 5 according to each clock pulse, is shown in FIG. 8.

As described above, the processing speed of the divider according to the present invention is very high and its susceptibility to integrated circuit fabrication is excellent since the subtractors have a simple circuit constitution using neural network configurations, which can be applied to the digital signal processing chip, the co-processor, etc.

What is claimed is:

1. A divider circuit for obtaining a quotient and a remainder by dividing a dividend by a divisor, said divider circuit comprising:

subtracting means for receiving said divisor and a first bit of said dividend, inputting said first bit into the least significant bit of a minuend and receiving a last operation dividend result generated during a preceding clock operation, said received last operation dividend result being positioned into the remaining bits of said minuend, said subtracting means generating a borrow output and a subtraction value in response to a subtraction operation between at least a portion of said divisor signal and said minuend;

multiplexing means coupled to said subtracting means for transmitting a selected value, said selected value being the minuend when the subtraction operation is negative and said subtraction value when said subtraction operation is positive;

first latch means for latching said divisor to a falling edge of a reset signal and supplying it to said subtracting means;

second latch means for latching the selected value from said multiplexing means during the rising edge of each clock pulse in a clock pulse train, providing a portion of said latched selected value representing said remaining bits of the minuend to the subtracting means during a next clock cycle, and outputting the latched selected value as a remainder result, said second latch means being initially cleared in response to said reset signal so that the remaining bits of the minuend are initially assigned a bit value of zero;

shift register means for parallely inputting said dividend during a falling edge of said reset signal and serially outputting each bit of the dividend during each subsequent rising edge of said clock pulse train, said serially outputted dividend being output to the minuend of said subtracting means starting with said first bit of said dividend, said shift register means simultaneously serially inputting said borrow output into a quotient of the division result; and control means for generating said reset signal, said clock pulse train and a clock pulse, said clock pulse for reading out said quotient and said remainder result of a last subtraction operation.

2. The divider circuit of claim 1, wherein said subtracting means comprises plural inverters for inverting the divisor and a plurality of 3-bit adders, each 3-bit adder for adding the inverted divisor to the minuend in units of 3 bits, said plurality of 3-bit adders connected in cascade order.

3. The divider circuit of claim 2, wherein each 3-bit adder comprises:

four output lines;

a plurality of input transistor means for current loading each of said output lines with a drive current, each of said plurality of input transistor means having a predetermined current loading strength and being activated in response to a respective 3-bit adder input connected thereto;

connecting a first power source voltage to each output line with the connecting intensity of the weight of each bit according to a 3-bit augend, a 3-bit addend and a 1-bit carry input transmitted in the lower carry terminal;

a plurality of first bias transistor means for providing a first bias current to each corresponding output line;

a plurality of second bias transistor means, each for providing a predetermined bias current to each corresponding output line;

a plurality of feedback transistor means, each for providing a predetermined feedback current to select ones of said output lines;

a plurality of drivers, each connected to the output of a corresponding one of said output lines and generating a driver output signal in response to the current loading on the respective output line input thereto;

a plurality of inverter means, each connected to a corresponding one of said plurality of drivers for inverting the respective driver output signal input thereto.

4. The divider circuit of claim 3, wherein each of said plurality of input transistor means and each of said plurality of first bias transistor means comprise at least one PMOS transistor, and each of said plurality of second bias transistor means and each of said plurality of feedback transistor means comprise at least one NMOS transistor.

5. The divider circuit of claim 4, wherein the current loading strength of each PMOS transistor and each NMOS transistor is determined by the transistor geometrical aspect ratio and defined as the channel width to the channel length ratio of the particular transistor.

6. The divider circuit of claim 5, wherein the geometrical aspect ratio of a PMOS transistor of unity current loading strength is 5 $\mu$m/2 $\mu$m and the geometrical aspect ratio of an NMOS transistor of unity current loading strength is 2 $\mu$m/2 $\mu$m.

7. The divider circuit of claim 6, wherein each of said plurality of drivers comprises two CMOS inverters connected in cascade.

8. The divider circuit of claim 1, wherein said multiplexing means comprises an inverter for inverting the borrow output from said subtracting means, and a plurality of CMOS transmission gates for transmitting either the minuend or the subtraction value received from said subtracting means in response to the received borrow output and the inverted borrow output.

9. The divider circuit of claim 1, wherein said control means comprises:
   counting means for counting an external clock pulse input and generating a pulse output signal in response thereto;
   reset means for generating a reset signal in response to a predetermined value of said pulse output signal;
   detecting means for generating a high output signal when the pulse output signal is of a second predetermined value; and
   clocking means for receiving said external clock pulse input, said clocking means being set during a falling edge of the reset signal from said reset means and reset during a falling edge of the high output signal from said detecting means, and generating said clock pulse train in response thereto.

* * * * *